July 11, 1967 J. R. KOBELT 3,330,390
SINGLE LEVER MARINE ENGINE CONTROL UNIT
Filed Sept. 14, 1964 3 Sheets-Sheet 1

INVENTOR.
JACK R. KOBELT
BY Ernest E Carver
agent

INVENTOR.
JACK R. KOBELT

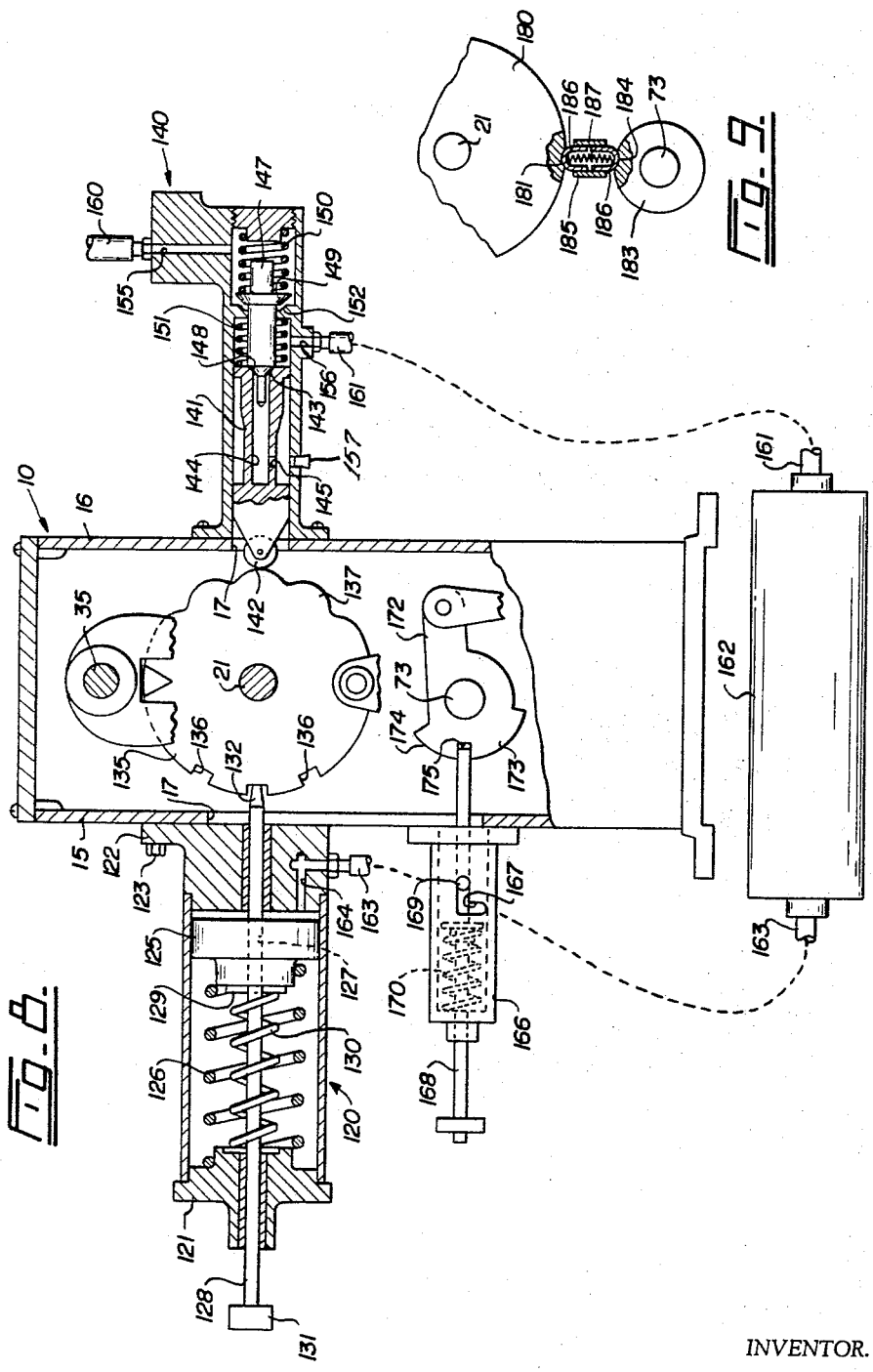

United States Patent Office

3,330,390
Patented July 11, 1967

3,330,390
SINGLE LEVER MARINE ENGINE
CONTROL UNIT
Jack R. Kobelt, % Kobelt Mfg., 801 Main St., Vancouver,
British Columbia, Canada
Filed Sept. 14, 1964, Ser. No. 396,130
6 Claims. (Cl. 192—.096)

This invention relates to a device for controlling the operation of a marine engine from one or more remote stations such as the boat's wheelhouse or the like.

An important object of the invention is to provide a simple mechanical unit which will enable both the clutch and the throttle of an engine to be controlled by a simple movement of a single lever.

A further object is to provide means whereby the throttle can be operated independently of the clutch.

A still further object is to provide an attachment for the control unit which will ensure that an inexperienced or careless operator does not operate the engine in such a way as to cause damage to the clutch.

Another object is to provide means whereby the independent throttle control can be rendered inoperative until the engineer judges it safe to accelerate the engine.

Referring to the drawings:

FIGURE 8 is a side elevation, part in section of a modification of the invention.

FIGURE 9 is a fragmentary front elevation of a further modification.

Figure 2:
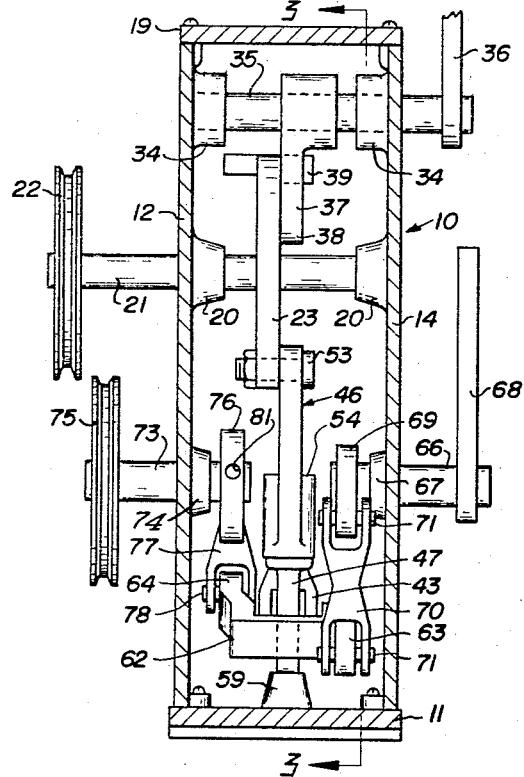
FIGURE 2 is an enlarged vertical section taken on the line 2—2 of FIG. 1.
Figure 3:
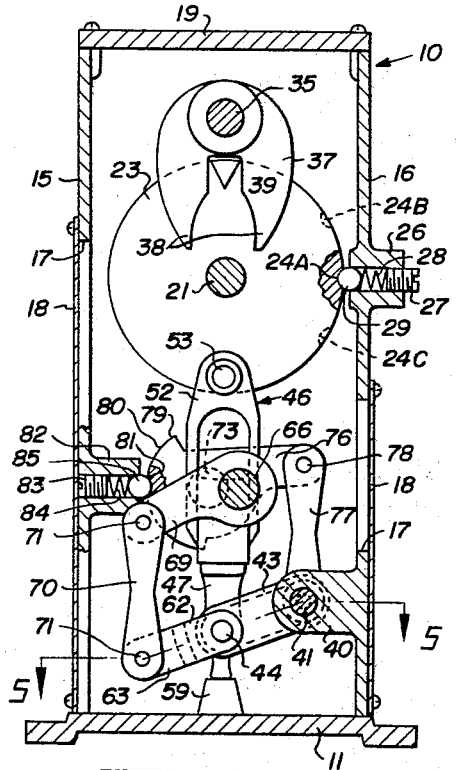
FIGURE 3 is a section taken on the line 3—3 of FIG. 2.
Figure 5:
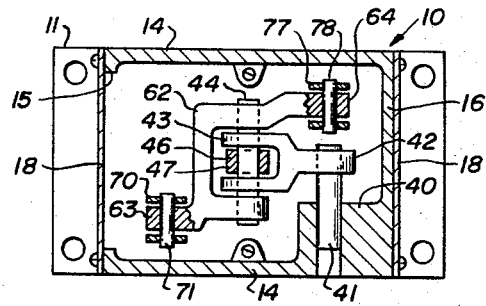
FIGURE 5 is a sectional plan taken on the line 5—5 of FIG. 3.
Figure 4:
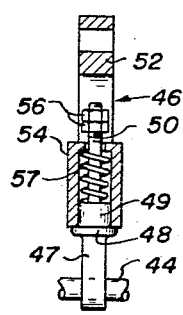
FIGURE 4 is a vertical section of the connecting rod.

Referring to FIGS. 2 and 3 it will be seen that the control unit consists of a casing 10 having a base 11, side walls 12 and 14 and end walls 15 and 16. Openings 17 are formed in the two end walls and removable plates 18 provide closures for said openings. A cover 19 is bolted to the top of the casing.

The side walls 12 and 14 have bearings 20 in which a main input shaft 21 is journalled and mounted on the exterior end of said shaft is a pulley 22. Within the casing the shaft 21 is fitted with a disc 23 and the rim of this disc is provided with three dished indents 24 which preferably are spaced some 30° apart.

The end wall 16 has an integrally formed sleeve 26 located in the horizontal plane of the shaft 21. This sleeve is fitted with a set screw 27, a spring 28 and a slidably mounted index ball 29. The spring pressed ball 29 bears against the rim of the disc so as to be engaged by the indents 23 as the disc is rotated. Thus the disc 23 may be rotated, by means of the shaft 21, to three positively located index positions which will be referred to later.

Above the main shaft the side walls 12 and 14 are provided with bearings 34 and a clutch shaft 35 is mounted in these bearings. Secured to the outer end of the shaft 35 is an arm 36. The clutch shaft is also fitted on its inner end, with a fork 37 having tines 38 which extend downwardly parallel to the disc 23. A triangular shaped lug 39 is formed on the inner face of the disc and is straddled by the tines 38. When the main shaft and disc are rotated in either direction the lug 39 bears against one of the opposing sides of the tines 38 and imparts equal and opposite rotation to the shaft 35.

The wall 14 is provided, at the lower right hand corner of the casing as viewed in FIG. 3, with an inwardly projecting sleeve bearing 40 in which a spindle 41 is journalled. An arm 42 is secured to the inner end of this spindle and the free end of said arm has a fork 43 in which a transversely extending hinge pin 44 is rotatably mounted.

The disc 23 and the pin 44 are connected together by a rod 46. This rod has a lower part 47 which projects through the forked end of the arm 42 where it is rotatably mounted on the pin 44. Above the pin 44 the connecting rod part 47 has a flange 48 which is superimposed by a boss 49 and a stem 50. The upper part 52 of the rod 46 is pivotally secured to the disc 23 by a bolt 53 and this part is provided, near its lower end, with a cylindrical socket 54. The boss 49 is slidably received in the open lower end of the socket and the stem 50 projects freely through an opening formed in the socket's upper end. A nut and locknut 56 are fitted to the threaded upper end of the stem. Enclosing the stem within the socket is a compression spring 57. The base 11 of the casing is provided with a stop or anvil 59 and, when the rod 46 is in the vertical position of FIG. 3, the lower end of the part 47 bears against this anvil. In this vertical position the flange 48 abuts the socket 54, the spring 57 is compressed to its fullest extent and the nuts 56 are spaced above the socket.

Rockingly mounted on the hinge pin 44 is a U-shaped bar 62 which straddles the forked end of the arm 42. This rocking bar is provided with offset extensions 63 and 64, the former projecting to the left of the bar and the latter to the right, see FIG. 3.

The casing wall 14 supports a throttle shaft 66 which is journalled in a bearing 67. The shaft 66 is fitted with an exterior arm 68 and an interior lever 69, which lever has its free end extending to the left, again as best shown in FIG. 3. The lever 69 and the extension 63 of the rocking bar are pivotally connected together by a link 70 and pins 71.

The casing 10 is also fitted with an independent input shaft 73, this shaft being mounted in a bearing 74 carried by the wall 12. A pulley 75 is fitted to the outer end of the shaft 73 and a lever 76 is secured to the shaft's inner end with the free end of the lever extending to the right. A link 77 and pivot pins 78 connect the free end of the lever 76 to the extension 64 of the rocking bar. The lever 76 is provided with a quadrant 79 on the left of the shaft 73 and this qudrant has an arcuate face 80 which is radiused about the axis of said shaft. A dished indent is formed on face 80 to provide a stop 81.

The wall 15 of the casing has an integral sleeve 82 and mounted in this sleeve is a screw 83, a spring 84 and a latch ball 85. The ball is supported in rolling contact with the face 80 and normally is lodged in the stop 81 so as to offer slight and yielding resistance to rotation of the lever 75 and its shaft 73.

Figure 1:
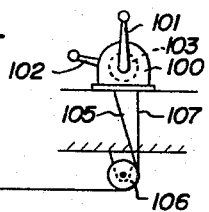
FIGURE 1 is a schematic view of the control unit in position of use.
Figure 1:
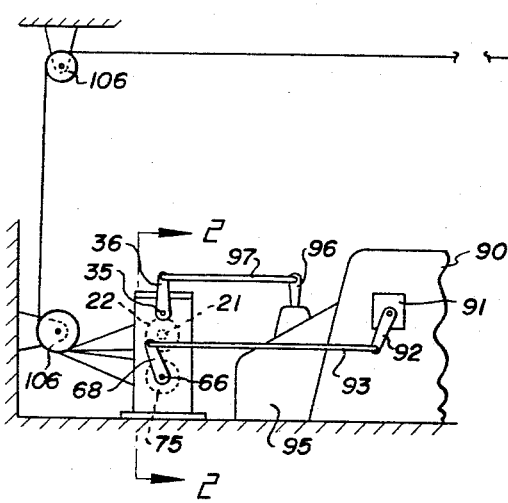

The above described unit is intended for use in controlling the operation of a marine motor, for example the diesel engine indicated by the numeral 90 in FIG. 1. Such an engine normally has a speed control device 91 which is actuated by movement of an arm 92. The present unit is suitably mounted near the engine 90 and the arms 68 and 92 are pivotally connected together by a rod 93. A diesel engine of this type might also be equipped with a hydraulically operated forward reverse clutch 95 adapted to be controlled by movement of an arm 96. A rod 97 would then pivotally connect the arms 36 and 96.

The wheelhouse of the boat powered by the engine 90 is provided with a conventional control head 100 having operating levers 101 and 102. Each of these levers may be rocked to impart rotation to a pulley 103. The pulley of the lever 101 is connected by an endless cable 105, trained over suitably located guide pulleys 106, to the pulley 22 mounted on the main shaft 35. A similarly rigged endless cable 107 connects the pulley 103 of the lever 102 to the pulley 75 on the shaft 73. Thus, by use of the lever 101, a crewman in the wheelhouse can shift the clutch 95 from neutral into either forward or reverse drive. Further movement of the lever 101 will also enable the engine to be advanced from idle position to full throttle and return. If desired engine speed can be regulated in the same manner independently of the clutch control by means of the lever 102 of the control head. This normally is done with the clutch in neutral and it permits the engine to be speeded up as required to operate auxiliary equipment such as pumps and the like. Obviously other control heads 100 could be similarly connected to the present control unit to enable the engine to be operated from other stations aboard the boat.

The above mentioned control of the engine can best be understood by reference to FIG. 3, the several parts of the control unit being in the positions shown when the clutch 95 is in neutral and the engine 90 is idling. Assuming the boat is to be moved ahead at full speed, the lever 101 is eased forward slightly so that the index ball 29 is dislodged from the indent 24A and is seated in the indent 24B. Movement of the disc 23 in this direction is augmented by the action of the spring 57 which fully extends the rod 46 when the clutch engaged index position of indent 24B is reached. The shafts 21 and 35, and their connected parts, are now in the positions shown in FIG. 6, the shaft 21 having rotated clockwise and the shaft 35 counterclockwise.

After a suitable pause to enable hydraulic pressure to build up in the clutch, the lever 101 is moved up slowly to its fully forward position.

As the shaft 21 is further rotated clockwise in response to this additional movement of lever 101, the now fully extended rod 46 raises the bar 62 by rocking it about the spindle 41. This motion is transmitted by the link 70 and lever 69 to the throttle shaft 66 which is rotated in the same clockwise direction. The several parts of the control unit are moved until they are disposed as shown in FIG. 7 and since the shaft 66 is operatively connected to the speed control device 91, said device is simultaneously shifted to the same full throttle position as the lever 101.

Figure 6:
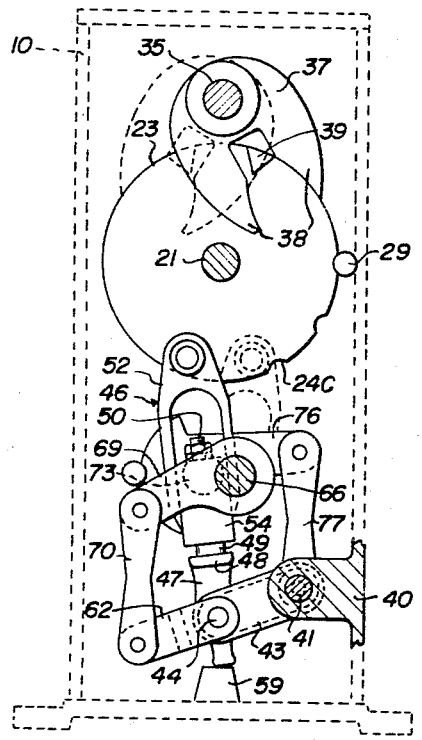
FIGURE 6 is a view showing some of the parts of FIG. 3 in the clutch engaged forward position.
Figure 7:
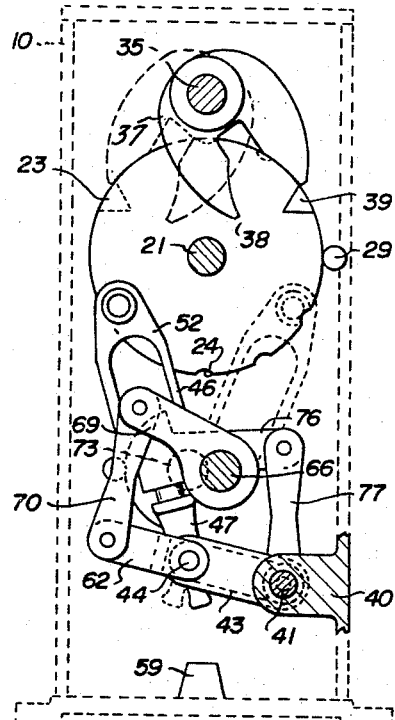
FIGURE 7 is a similar view of the same parts in the clutch engaged forward and full throttle positions.

As the disc 23 is moved from the clutch engaged or index position of FIG. 6 to the full throttle position of FIG. 7 the shaft 21 rotates through some 30°. The drive connection between the shafts 21 and 66 is such that as the shaft 21 rotates through this 30° the shaft 66 is rotated about 45°. Thus the sweep of the lever 101 is of normal length and during its movement the clutch 91 is engaged and the device 91 is advanced to full throttle. In this way the single lever 101 enables the engine 90 to be fully controlled by a simple and instinctive forward motion by the boat operator.

To move the boat in reverse the lever 101 is shifted from the centre position of FIG. 1 towards the stern. This rotates the shaft 21 counterclockwise and the shaft 35 in the opposite direction so that the clutch 95 is engaged in reverse. When the main and throttle shafts, plus their connected parts, reach the dotted line position of FIG. 6 the ball 29 seats in the indent 24C and indicates the clutch is engaged. During this clutch engaging movement the throttle shaft 66 remains stationary as before. After the usual pause at this point the shaft 21 is further rotated until its associated parts are in the dotted line positions of FIG. 7.

The connecting rod 46 swings to the right but in so doing again raises the rocking bar 62. Thus the shaft 66 is rocked in the same clockwise direction as before and the device 91 is advanced to full throttle if maximum speed is required. The throttle shaft 66 is again rotated through a greater arc than the main shaft and as a result the sweep of the lever 101 is normal and constant for both forward and reverse.

When it is necessary to accelerate the motor with the clutch in nuetral the lever 102 of the control head is used. This lever is advanced on the head to rotate the independent throttle shaft 73 clockwise as viewed in FIG. 3. The latch ball 85 is dislodged from the stop 81 and rolls along the face 80 of the quadrant as the lever 76 rocks with the shaft. The bar 62 is rotated about the hinge pin 44 and as a result the throttle shaft 66 is moved in the same clockwise direction to actuate the speed control device 91. Since the bar 62 at this time pivots about the pin 44 rather than the spindle 41 as before, the shafts 73 and 66 are rotated through the same distance as the speed control device is operated from idle to full throttle and return. In the idle position the ball 85 is again seated in the stop 81 to yieldably support the several parts in this position. The engine 90 can be shut down entirely by use of the lever 102. This lever is simply actuated to rock the shaft 73 in a counterclockwise direction whereupon the ball 85 is dislodged from its stop to travel a short distance along the face 80 which movement will shut down the engine.

In the modified form of the control unit shown in FIG. 8, the casing 10 is fitted with a horizontally disposed cylinder 120. This cylinder has a head 121 and a base block 122 which is bolted as at 123 to the casing end wall 15. A piston 125 and a large spring 126 are carried within the air cylinder 120, the spring urging the piston towards the base block. The piston 125 has a bore 127 in which a rod 128 is slidably mounted and this rod is fitted with a transversely extending pin 129. A small spring 130 encloses the rod between the head 121 and the pin 129 and urges said pin into contact with the end of the piston 125. The rod 128 projects through suitable sleeve bearings carried by both the cylinder head and base block and also through an opening 17 into the interior of the casing 10. A crossbar 131 is fitted to the outer end of the rod 128 and the inner end of said rod is tapered as at 132.

The main shaft 21 of the modified unit is fitted with a disc 135 and the rim of this disc is provided with three transverse slots 136. These slots are preferably spaced some 30° apart on the rim and are adapted to receive the tapered end 132 of the rod 128. The rim of the disc 135 is also provided with three cam lobes 137. The spacing of the lobes on the rim corresponds to that of the slots, that is, there is one such lobe diametrically opposed to each slot.

Mounted on the wall 16 of the casing is poppet type air valve 140 which is horizontally aligned with the cylinder 120 and, like said cylinder, is disposed in the same plane as the main shaft 21. The air valve has a plunger 141 which projects through an end wall opening 17 and which is fitted at its inner end with a roller 142. A valve seat 143 is formed on the inner end of the plunger 141 which plunger has a bore 144 and an outlet 145 thereto. A stem 147, having valves 148 and 149, is mounted in the valve body. The valve 148 normally is held against the seat 143 by a spring 150 and a second spring 151 urges the plunger 141 towards the disc 135. With the roller 142 engaging a cam lobe 137 the valve 149 is supported off its valve body seat 152. The valve body is provided with an air inlet port 155, and inlet-outlet port 156 and a vent 157 to atmosphere.

Air from a suitable pressure source is fed to the port 155 by a pipe 160 and this air is conducted by a second pipe 161 from the port 156 to an accumulator tank 162. This tank is connected by a pipe 163 to ducts 164 formed in the base block 122 so as to admit air to the cylinder 120 beneath its piston 125.

Beneath the air cylinder 120 the casing end wall is fitted with a sleeve 166 having an L-shaped slot 167 formed in its side. A locking pin 168 is slidably supported in the sleeve, the pin being provided with a lug 169 which projects through the slot 167. The sleeve has a spring 170 which must be compressed to pull the pin outwardly of the sleeve.

The independent throttle shaft 73 of the modified control unit is fitted with a lever 172 which is link connected to the rocking bar 62 as before. This lever again has a quadrant 173 with a face 174 radiused about the shaft 73. However, in lieu of an indent, the face 174 is provided with a notch 175 in which the inner end of the locking pin 168 is normally seated. When the pin is so seated the engine 90 will idle in the normal manner but it cannot be accelerated beyond idling speed in response to rotation of the throttle shaft 73.

The remainder of the parts of the modified control unit are the same as in the preferred embodiment and their movements are substantially as before described when the lever 101 is actuated to operate the engine.

The valve 140 normally places the accumulator 162 in direct communication with the air source, the air pressure from the source being regulated by suitable valves, not shown, to maintain said accumulator at a pressure of, say 60 lbs. per sq. in. This pressure is just sufficient to hold the piston 125 a short distance away from the base block 122 whereby to support the rod end 132 out of contact with the edge of the disc 135. When the lever 101 is operated to engage the clutch 95 in forward drive the disc 135 is rotated to place the lowermost slot in alignment with the rod 128. At the same time the roller 142 traverses the low part of the cam track between two lobes 137 and in doing this momentarily opens valve 148 and closes valve 149. This movement of the two valves allows the accumulator to exhaust all of its pressure through the vent 157. The total loss of air pressure enables the spring 126 to move the rod 128 so that its end 132 is seated in the slot 136. The disc 135 is thus held against further rotation for a period of say, 5 seconds, during which time hydraulic pressure in the clutch 95 is allowed to build up to the required maximum. When the rod 128 is again retracted in response to the air pressure being built up to the required 60 lbs. the lever can again be moved to advance the throttle to its desired setting.

In the same manner the present control unit is automatically locked for this 5 second interval as it is returned to the throttle idle and clutch in neutral position. Obviously the same automatic locking will take place when the clutch is moved to reverse and the throttle is advanced. The unit thus has a time delay system which will prevent damage to the clutch and other parts by a careless or inexperienced operator. If at any time it is desired to render the system inoperative this can be done by holding the rod 128 in retracted position by hand.

Many boats are equipped with a propeller shaft brake which is applied automatically whenever the clutch is in neutral position. It should be noted the above described delay in neutral would be provided only if such a shaft brake was fitted and in operation. For example, if the clutch was thrown into neutral when the boat was moving forward the propeller would cause the drive shaft and the driven part of the clutch to rotate unless held by an automatic brake. A delay at such a time might cause the damage which is avoided by the present time delay system. If the present control unit is used on an installation without a propeller shaft brake the middle slot 136 could be eliminated along with its corresponding cam lobe 137. In such a case the control unit would be momentarily locked only in the two clutch engaged positions.

In some installations it would be desirable to have the independent input shaft 73 locked in the idle position. This would prevent the shaft 73 from being rocked in response to rotation of the shaft 21. For example, the resistance to rotation of the shaft 66 might be greater than that of the shaft 73. If this was so, when the clutch and throttle were operated by means of the control head lever 101, the shaft 73 might be rocked to the full stop position. This would almost certainly occur if the shaft 73 was adapted for engine room control rather than being cable and pulley connected to the lever 102 as herein described. To lock the independent input shaft in idle position the pin 168 is seated in the notch 175, thus positively holding the lever 172 and its shaft 73 against rotation. To unlock the shaft 73 it is necessary for someone in the engine room to withdraw the pin 168 slightly and lodge the lug 169 in the transverse portion of the slot 167. This permits the engine to be controlled again by means of the lever 102 or by means of the engine room control if one is provided.

In the modification shown in FIG. 9 the main input shaft 21 is fitted with a disc 180 having an indent 181 on a lower part of its rim. The independent input shaft 73 carries a smaller diameter disc 183 which has rim indent 184. Between these two discs the wall 12 of the casing is provided with a vertical sleeve 185 and mounted in said sleeve is a pair of plungers 186. The plungers are hollow cylinders with rounded ends and a spring 187 is mounted within the plungers to urge them apart and into engagement with the rims of the discs 180 and 183.

FIG. 9 shows the disc 180 in the position it assumes when the clutch 95 is in neutral while the disc 183 is shown in the idle position of the speed control device 91. At this time the plungers 186 are supported by their common spring 187 and their rounded ends seated in the indents 181 and 184. When the lever 101 is operated to actuate the clutch and throttle of the engine 90 the disc 180 is rotated in the manner previously described and the upper plunger 186 is forced out of its indent 181 and into contact with the lower plunger. The spacing between the adjacent ends of the plungers is such that only one plunger can move at a time, therefore the above mentioned movements of the disc 180 has the effect of locking the disc 183 against any movement whatsoever. Thus it is not possible for someone to first accelerate the engine by use of the lever 102 and then engage the clutch by use of the lever 101. The two shafts 21 and 73 are interlocked so that when one of the levers of the control head 100 is moved the other of the control head levers is rendered inoperative. This further safeguards the engine from damage through carelessness on the part of a crew member.

What I claim is:

1. In a control unit for a marine engine having a throttle and a clutch adapted to be shifted from neutral to either forward or reverse, the combination of a casing having a main input shaft, an independent input shaft, a clutch operating shaft and a throttle operating shaft, a drive member on the inner end of the main input shaft, a driven member on the inner end of the clutch shaft and engaging the driven member, said clutch shaft being adapted to be rotated to either forward or reverse position in response to initial rotation only of the main input shaft, a hinge pin swingingly mounted in the casing, an extensible rod operatively connecting the drive member to the hinge pin, a rocking bar mounted on the hinge pin, means operatively connecting one end of the rocking bar to the throttle shaft, said throttle shaft being adapted to be rotated in response to continued rotation of the main input shaft subsequent to the clutch shaft being rotated to either forward or reverse position, means operatively connecting the independent input shaft to the opposite end of the rocking bar whereby the throttle shaft can be rotated with the clutch shaft in neutral position.

2. In a control unit as claimed in claim 1, and indexing means carried by the casing and engaging the drive member on the main input shaft whereby to indicate the neutral, forward or reverse position of the clutch shaft.

3. In a control unit as claimed in claim 1, and stop means carried by the casing and yieldably engaging the last named means whereby a predetermined resistance is offered to rotation of the independent input shaft.

4. In a control unit as claimed in claim 1, wherein said extensible rod is retracted in the neutral position and extended in either the forward or reverse position and a spring urges the extensible rod towards the last two named positions.

5. In a control unit as claimed in claim 1, and means for automatically locking the main input shaft when the clutch shaft reaches either forward or reverse position and means for releasing the locking means after a predetermined interval to permit continued rotation of the main input shaft.

6. In a control unit as claimed in claim 5, and manually operable means for locking the independent input shaft against rotation.

References Cited

UNITED STATES PATENTS

| | | | |
|---|---|---|---|
| 2,867,131 | 1/1959 | Schroeder | 74—472 |
| 2,867,132 | 1/1959 | Schroeder | 74—472 |

DAVID J. WILLIAMOWSKY, *Primary Examiner.*

H. S. LAYTON, *Assistant Examiner.*